US006640337B1

(12) United States Patent
Lu

(10) Patent No.: US 6,640,337 B1
(45) Date of Patent: Oct. 28, 2003

(54) DIGITAL TELEVISION (DTV) INCLUDING A SMART ELECTRONIC PROGRAM GUIDE (EPG) AND OPERATING METHODS THEREFOR

(75) Inventor: Jin Lu, Croton-on-Hudson, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/431,799

(22) Filed: Nov. 1, 1999

(51) Int. Cl.[7] .............................. G06F 3/00; H04N 5/44
(52) U.S. Cl. ............................ 725/39; 725/53; 725/52; 725/85; 348/734
(58) Field of Search ........................ 725/53, 52, 44; 345/156; 348/157, 734

(56) References Cited

U.S. PATENT DOCUMENTS

| 4,787,051 | A | * | 11/1988 | Olson ........................ 345/179 |
| 5,541,738 | A | | 7/1996 | Mankovitz .................. 358/335 |
| 5,545,857 | A | | 8/1996 | Lee et al. .................... 178/18 |
| 5,598,187 | A | * | 1/1997 | Ide et al. .................... 345/158 |
| 5,673,087 | A | | 9/1997 | Choi et al. .................. 358/511 |
| 5,673,337 | A | | 9/1997 | Gallo et al. ................. 382/187 |
| 5,686,954 | A | * | 11/1997 | Yoshinobu et al. ............ 725/43 |
| 5,757,962 | A | * | 5/1998 | Gallo et al. ................. 382/204 |
| 5,889,506 | A | * | 3/1999 | Lopresti et al. ............. 345/158 |
| 5,892,501 | A | * | 4/1999 | Kim et al. .................. 345/158 |
| 6,075,526 | A | * | 6/2000 | Rothmuller ................. 345/721 |
| 6,107,992 | A | * | 8/2000 | Ishigaki ..................... 257/329 |
| 6,130,664 | A | * | 10/2000 | Suzuki ....................... 345/158 |
| 6,133,909 | A | * | 10/2000 | Schein et al. ............... 345/721 |
| 6,181,329 | B1 | * | 1/2001 | Stork et al. ................. 345/179 |
| 6,216,264 | B1 | * | 4/2001 | Maze et al. .................. 725/53 |
| 6,281,888 | B1 | * | 8/2001 | Hoffman et al. ............. 345/179 |
| 6,292,181 | B1 | * | 9/2001 | Banerjee et al. ............. 345/179 |
| 6,407,779 | B1 | * | 6/2002 | Herz .......................... 348/734 |

FOREIGN PATENT DOCUMENTS

| EP | 0580119 A2 | 7/1993 | .......... G06F/15/28 |
| EP | 0633661 A1 | 7/1994 | .............. H03J/1/00 |
| EP | 0838945 A2 | 4/1998 | ............. H04N/5/44 |

* cited by examiner

Primary Examiner—John Miller
Assistant Examiner—Annan Q. Shang
(74) Attorney, Agent, or Firm—Gregory L. Thorne

(57) ABSTRACT

A digital television (DTV) system includes a remote controller which generates X- and Y-axis position data; and an electronic pro gram guide (EPG) controller which receives position data responsive to the X- and Y-axis position data, which generates character data responsive to the position data, which searches EPG data for character strings approximating the character data to thereby generate search results, and which outputs the search results to the screen of the DTV. According to one aspect of the DTV system, the remote controller generates the X- and Y-axis position data responsive to movement of the remote controller. This movement can be determined by either accelerometers or a gyroscope included in the remote controller. According to another aspect of the invention, the X- and Y-axis position data can be generated by a pointing device, which can be either a touch panel or a trackball. A method for operating the DTV system responsive to changes in position data generated with respect to a remote controller is also described.

20 Claims, 12 Drawing Sheets

DIGITAL TELEVISION (DTV) INCLUDING A SMART ELECTRONIC PROGRAM GUIDE (EPG) AND OPERATING METHODS THEREFOR

BACKGROUND OF THE INVENTION

The present invention relates generally to a digital television (DTV) system including an electronic program guide (EPG). More specifically, the present invention relates to DTV systems and corresponding methods for generating text input to a smart EPG search engine through character recognition.

Digital television (DTV) technology provides the bandwidth for conveying both the viewed program and a large amount of data, e.g., an electronic program guide (EPG) such as that disclosed in U.S. Pat. No. 5,541,738. It should be mentioned that the '738 patent is incorporated herein by reference for all purposes.

There are a number of ways that the viewer can interact with an EPG program. For example, the EPG program can present the viewer with one of more menus. During program selection or video cassette recorder (VCR) programming, the viewer is prompted with a menu. Selection of an item in a menu can, as often as not, lead the viewer to another menu. Several menus can appear on the viewers television. It will be appreciated that as EPG data become increasingly more complex, navigating these menu menus can present some problems for ordinary viewers who are not "computer literate". Moreover, scrolling and tabbing through EPG menu layers can become time consuming if the EPG data is organized into more than a small number of menu layers.

Several different approaches to navigation of EPG data have been developed over the years. U.S. Pat. No. 5,541,738 (discussed above) advocates the use of a remote control with a number of extra keys, which keys facilitate navigation through the EPG data. In contrast, there has been a significant amount of development in supplying text to a search engine connected to the EPG so that viewer can input, for example, a desired program title and the DTV can cause the EPG to output all occurrences of that title. Moreover, such search engines in the DTV can be operated to select and display all programs in a particular genre, i.e., sports. Once the list of candidate programs are presented to the viewer, the viewer can select a specific program by scrolling through the truncated program list, i.e., the search results.

However, assuming that the viewer desires to input text into an EPG search engine in the DTV, there are several different possibilities for generating the requisite text. The first mechanism is a keyboard operatively connected to the DTV. The keyboard can be directly connected to the DTV or could be coupled to the DTV by infrared (IR) or radio frequency (RF) signals. However, it will be appreciated that the viewer now has to maintain two devices, the remote control and the keyboard. Moreover, if the viewer was intimidated by the EPG menus, the viewer is likely to be similarly uncomfortable with the use of an auxiliary keyboard.

FIG. 1 illustrates a remote controller 1001 which has recently been introduced to the market place and which includes a touch screen 1010 and a virtual keyboard 1012. The virtual keyboard 1012 eliminates the concern regarding0 the need to maintain several pieces of equipment, i.e., a remote controller and a keyboard, but does little to alleviate the viewer's computer anxiety. Moreover, the small size of the virtual keyboard 1012 makes it difficult for the visually or physically challenged to see and/or operate this keyboard.

Character recognition systems and methods are known. For example, U.S. Pat. No. 5,545,857 discloses an alternative remote controller for recognizing characters written to a touch screen. U.S. Pat. No. 5,673,337 discloses one such character recognition system. Recognition of the user's handwriting on a touch screen advantageously can be employed to input information to other devices such as personal digital assistants (PDAS). Moreover, a similar touch screen could be incorporated into a DTV receiver to provide a source of text representing a key word, a title, or a subject to a "smart" EPG program, i.e., an EPG program incorporating a search engine. However, in the case of the DTV, since the viewer is sitting, several feet away from the DTV receiver, the inclusion of a touch screen in the DTV does not provide a convenient way for the viewer to operate the EPG program.

A remote controller which overcomes this limitation and, thus, provides another possible source of text for input to the search engine of the EPG included in the DTV is the remote controller disclosed in European Patent Application No. 0 633 661 A1 (the EP 661 application), which application is incorporated herein by : reference. The EP 661 application discloses a remote control device having a touch sensitive screen. More specifically, FIG. 2 illustrates a remote controller 236, which includes a microprocessor 210 operatively connected to the touch screen 238. The microprocessor 210 interprets characters written on the touch screen 238 in accordance with a program stored in EPROM 212 controller and outputs the characters to the DTV via a IR driver 214 and an IR transmitter 216. A stylus 240 can be employed in writing characters on the touch screen 238.

Thus, the viewer can write letters on the touch screen 238. These letters are then recognized by the microprocessor 210 executing a character recognition program and transmitted to, for example, the search engine associated with the EPG in the DTV. It will be appreciated that the character recognition program represents a significant memory overhead for a remote controller, not to mention increasing the size and complexity of the microprocessor 210 employed in the remote controller 136.

What is needed is an improved method for setting character data used in searching stored EPG data. Stated another way, what is needed is an improved method for providing search terms to the search engine associated with an EPG in a DTV without either a real or a virtual keyboard. It would be beneficial if the DTV system could be adapted to accept a variety of inputs. It would be particularly advantageous if the EPG system in the DTV included a search engine with a front end capable of accepting X and Y-axis position data.

SUMMARY OF THE INVENTION

Based on the above and foregoing, it can be appreciated that there presently exists a need in the art for a digital television (DTV) incorporating a smart electronic program guide,(EPG) system which overcomes the above-described deficiencies. The present invention was motivated by a desire to minimize the drawbacks and shortcomings of the presently available technology, and thereby fulfill this need in the art.

In one aspect, the present invention provides a digital television (DTV) system, which preferably includes a remote controller which generates X- and Y-axis position data, and an electronic program guide (EPG) controller which receives position data responsive to the X- and Y-axis position data, which generates character data responsive to the position data, which searches EPG data for character strings approximating the character data to thereby generate search results, and which outputs the search results to the screen of the DTV. More specifically, the remote controller generates the X- and Y-axis position data responsive to movement of the remote controller. This movement can be determined by either accelerometers or a gyroscope included in the remote controller. Alternatively, the X- and Y-axis position data can be generated by a pointing device, which can be either a touch panel or a trackball.

In another aspect, the present invention provides a digital television (DTV) system including a remote controller which generates a plurality of different electromagnetic signals occupying a predetermined beam pattern, a sensor array which determines X- and Y-axis position data responsive to the relative position of the sensor array within the beam pattern; and an electronic program guide (EPG) controller. Preferably, he EPG controller accumulates position data responsive to the X- and Y-axis position data, generates character data responsive to the X- and Y-axis position data, searches EPG data for character strings approximating the character data to thereby generate search results, and outputs the search results to the screen of the DTV. Alternatively, the position data varies responsive to movement of the remote controller.

In yet another aspect, the present invention provides a method for operating a digital television (DTV) system storing electronic program guide (EPG) data responsive to X- and Y-axis position data generated by a remote controller. Preferably, the method includes steps for accumulating position data corresponding to the X- and Y-axis position data to thereby produce accumulated position data; recognizing character data included in the accumulated position data; searching the stored EPG data for character strings approximating the character data to thereby generate search results; and displaying the search results on the DTV. Advantageously, the method also includes a step for generating the X- and Y-axis position data by moving the remote controller. Alternatively, the X- and Y-axis position data can be generated by moving either a predetermined portion of the remote controller or a pointer relative to a predetermined portion of the remote controller.

In a still further aspect, the present invention provides a method for operating a digital television (DTV) system storing electronic program guide (EPG) data responsive to X- and Y-axis position data generated by movement of a remote controller. Preferably, the method includes steps for:

transmitting a plurality of electromagnetic signals from the remote controller;

sensing the beam pattern of the electromagnetic signals relative to a sensing array to thereby generate the X- and Y-axis position data;

converting the X- and Y-axis position data into position data;

accumulating position data corresponding to the X- and Y-axis position data to thereby produce accumulated position data;

recognizing character data included in the accumulated position data; and searching the stored EPG data for character strings approximating the character data to thereby generate search results; and displaying the search results on the DTV.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which.

DETAILED DESCRIPTION OF THE PREFERRED EMBODIMENTS

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to teachings provided herein will recognize additional modifications, applications, and embodiments within the scope thereof and additional fields in which the present invention would be of significant utility.

Figure 1:
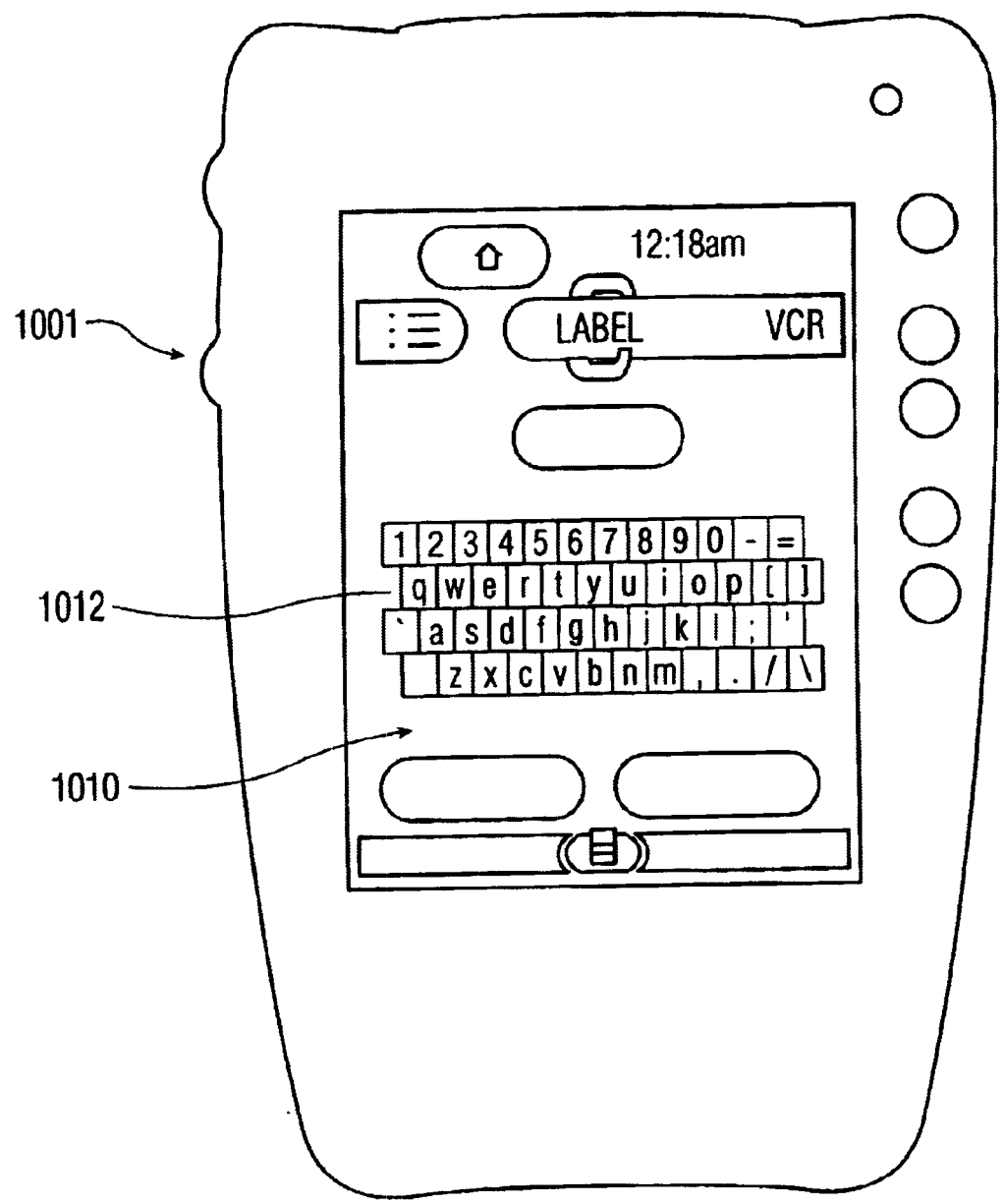
FIG. 1 is an illustration of a remote controller providing a virtual keyboard for inputting character data.
Figure 2:
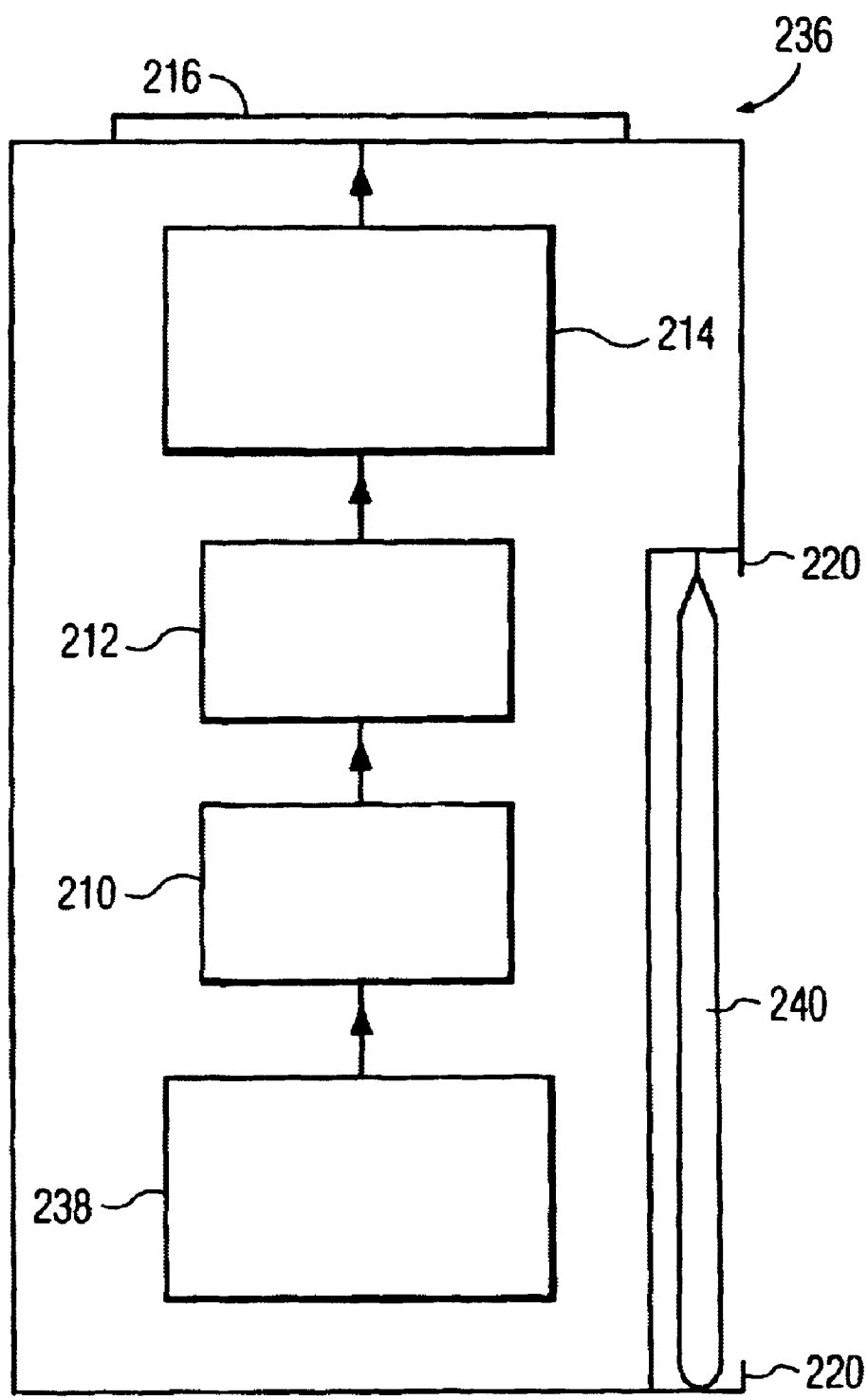
FIG. 2 illustrates a conventional remote controller generating character data from hand written characters input on a touch screen.
Figure 3:
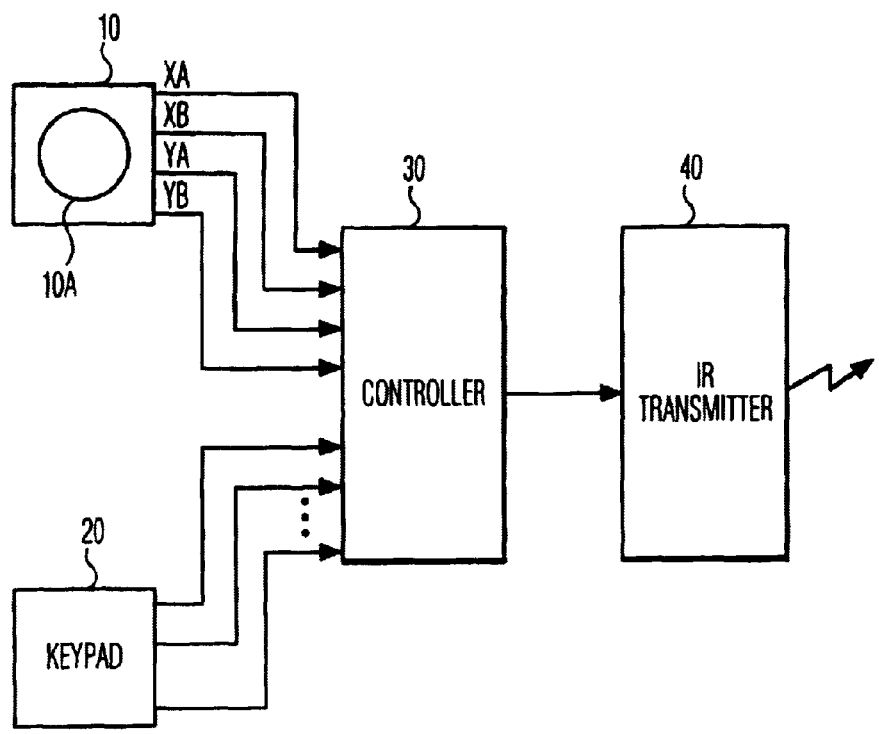
FIG. 3 is a block diagram showing a pointing device wireless transmitter of the present invention.
Figure 4:
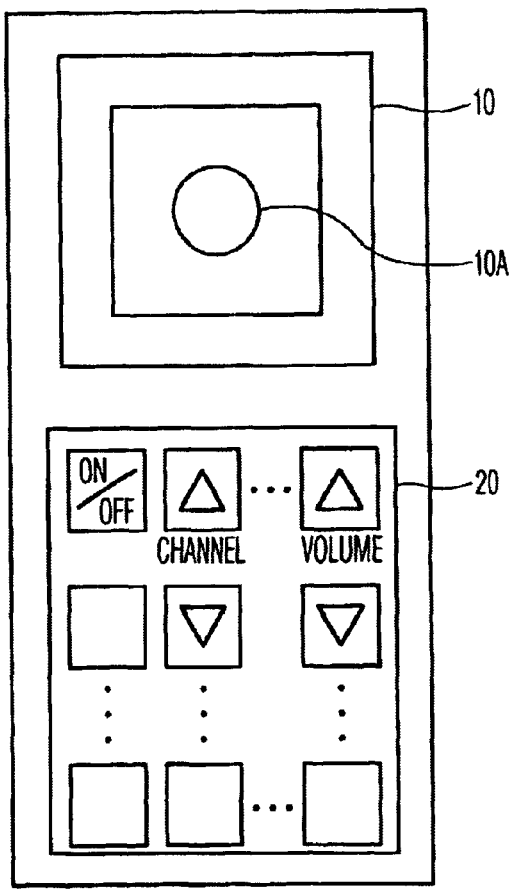
FIG. 4 illustrates a two dimensional (2D) remote controller according to a first embodiment of the invention.

FIG. 3 is a block diagram showing a two dimensional (2D) wireless transmitter of a pointing device, such as a remote controller or computer mouse, according to the present invention. In one preferred embodiment of the invention, the 2D remote controller consists of a pointer 10 including a trackball 10A, a keypad 20, a controller 30, and an IR transmitter 40. FIG. 4 illustrates one possible arrangement of the 2D remote controller wherein the trackball 10A and keypad 20 are formed into a single device, i.e., remote controller 1. Addition details are provide in U.S. Pat. No. 5,673,087, which patent is incorporated herein by reference.

Figure 5:
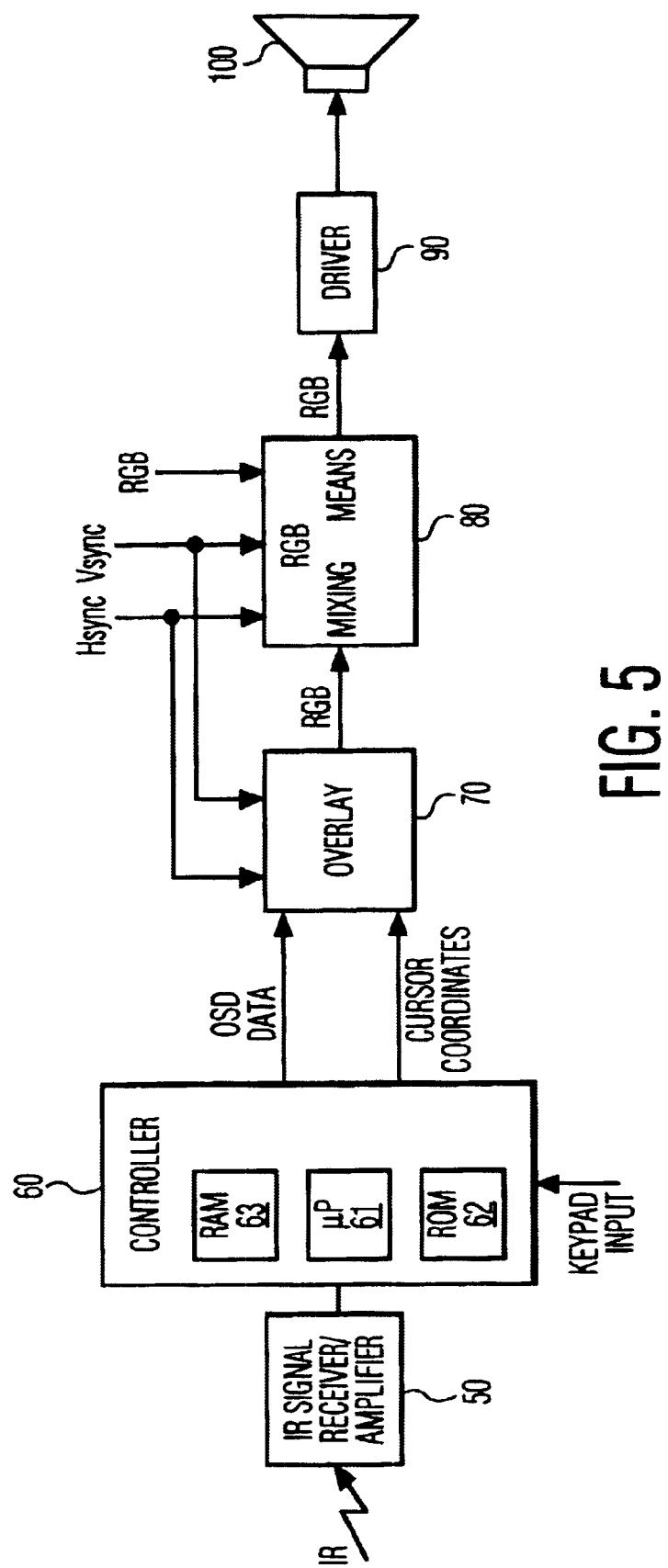
FIG. 5 is a block diagram illustrating selected portions of a DTV including a "smart" EPG processor of the present invention.

As discussed in detail below, the remote controller 1 advantageously generates X and Y coordinate data, i.e., X- and Y-axis position data, which is applied to the DTV. Variance from the current position of the pointer 10 is calculated, based on an X and Y axes coordinate system, by controller 30 according to signals XA, XB, YA and YB, i.e., electrical signals representing the movement of the trackball 10A of pointer 10. The result is converted into an IR signal via IR transmitter 40 and then output. FIG. 5 illustrates an embodiment of the present invention showing selected portions of a DTV including a screen cursor overlay device that receives a signal from the 2D remote controller 1 shown in FIG. 3 and the smart EPG processor coupled 60 thereto. The circuitry shown in FIG. 5 includes an IR signal receiver/amplifier 50 for receiving an IR signal from the 2D remote controller 1 and amplifying the received signal by a predetermined gain. Furthermore, the DTV includes a controller 60 which, in an exemplary case, includes a microcomputer 61, and which receives the amplified IR signal and calculates and a cursor coordinate value. The controller 60 advantageously can output on-screen-display (OSD) data for displaying a menu on the screen of the DTV.

The circuitry of FIG. 5 also includes an overlay unit 70 for receiving the cursor coordinate value and OSD data input from controller 60, and generating a red-green-blue (RGB) signal. An RGB mixer 80 mixes the RGB signal from overlay unit 70 with an external RGB signal. A driver 90 receives the RGB signal output from RGB mixer 80 so as to drive a screen display 100.

IR signal receiver/amplifier 50 receives and amplifies the two X and Y-axis position data blocks generated by the controller 30 and broadcast by the IR transmitter 40 and delivers the amplified signal to controller 60. Controller 60 calculates a cursor coordinate value and delivers the X and Y screen data, i.e., screen position data, to overlay unit 70. Moreover, the controller 60 accumulates the X and Y position data, i.e., coordinates, and analyzes the accumulated position data using a character recognition routine or program, which advantageously can be stored in the read-only memory (ROM) 62 included in the controller 60. Character data generated by the character recognition routine is applied to a search engine, which advantageously can be executed on the controller 60 using instructions stored in ROM 61 and EPG data stored in random access memory (RAM) 62, which is also included in controller 60. Thus, controller 60 constitutes the smart EPG controller of the present invention. The results produced by the search engine advantageously can be output as OSD data, which data will ultimately be displayed on screen display 100.

Figure 6:
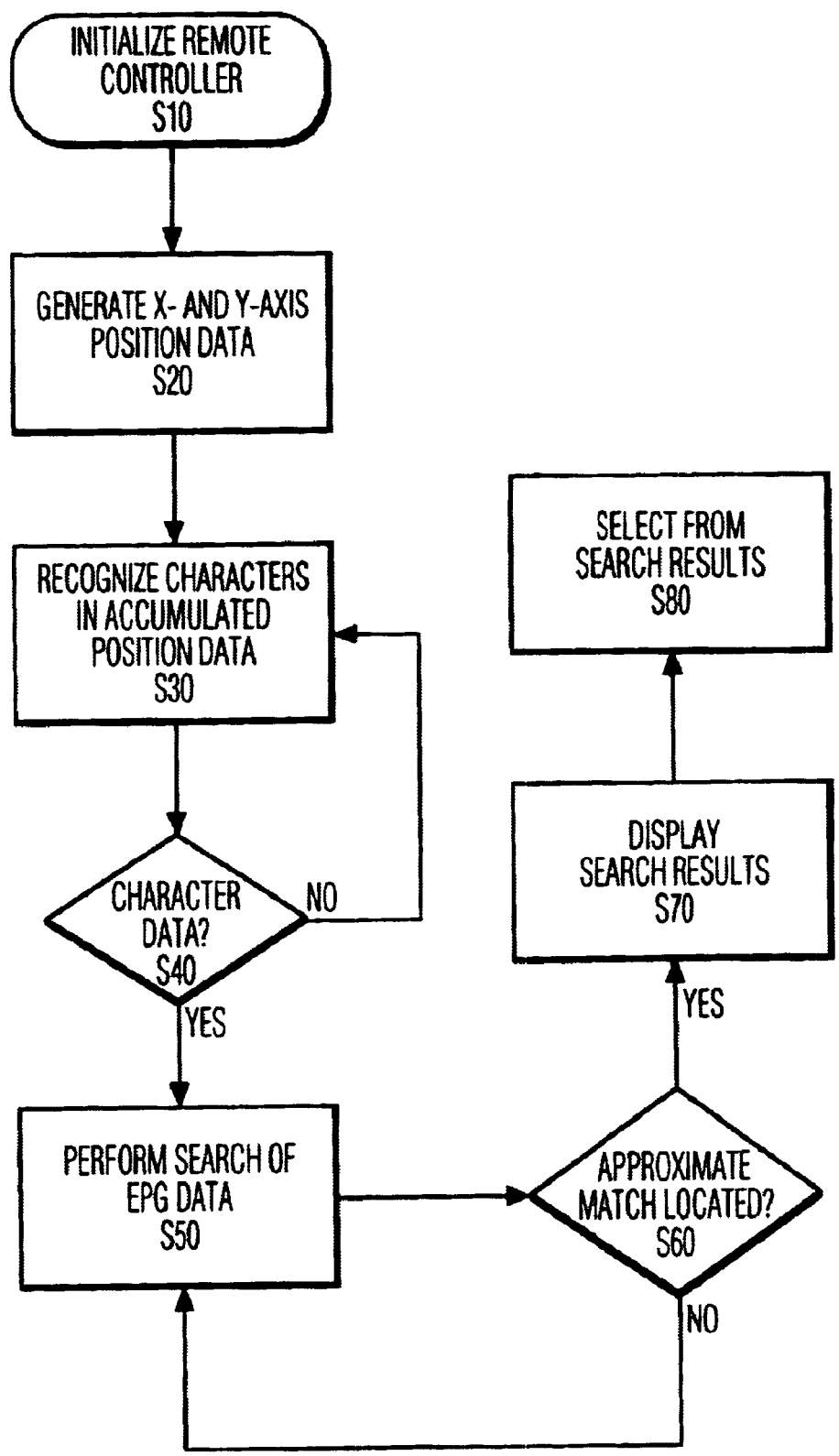
FIG. 6 is a flowchart of the operation of the smart EPG processor according to the present invention.

The method for operating the smart EPG controller according to the present invention will now be described while referring to FIG. 6. The method begins at step S10, when the viewer activates the remote controller 1 in the 2D (3D) position generating mode. In the exemplary case being discussed, this advantageously can simply be the viewer operating the trackball 10A. Alternatively, step S10 can also be initiated by operation of a mode selector key (not shown) on the keypad 20. In any event, at least X- and Y-axis position data advantageously are generated and transmitted to the receiver/amplifier 50, which applies the amplified X- and Y-axis position data to the controller 60 during step S20.

During step S30, the controller 60 accumulates the position data corresponding to the X- and Y-axis position data generated by remote controller 1 and applies the accumulated position data to a character recognition routine. A check is then performed at step 40 to determine whether the accumulated position data includes recognizable characters. In the answer is negative, the character recognition routine of step S30 is repeated. However, it the answer at step S40 is affirmative, the character data is applied to an EPG search routine S50, which searches the EPG data for character strings matching, or at least approximating, the applied character data. It will be appreciate that approximate matches are available from fuzzy logic search engines and the like. A query is then performed at step S60 to determine whether matching character strings have been located in the EPG data stored in RAM 63. When the answer is negative, step S50 is repeated until a timer (not shown) in controller 60 times out, whereupon the search engine is reset. When the answer is affirmative, the search results are converted to OSD data and applied to the overlay unit 70 during step S70. During step S80, the cursor coordinates generated by controller 60 and applied to overlay unit 70 are employed to facilitate selection between the search results in the usual manner.

A three dimensional (3D) wireless remote controller 1' according to a second preferred embodiment of the present invention suitable for use with the DTV system will now be described while referring to FIGS. 7–13. Additional details regarding the specific circuitry is found in U.S. Pat. No. 5,892,501, which patent is incorporated herein by reference for all purposes.

Figure 7:
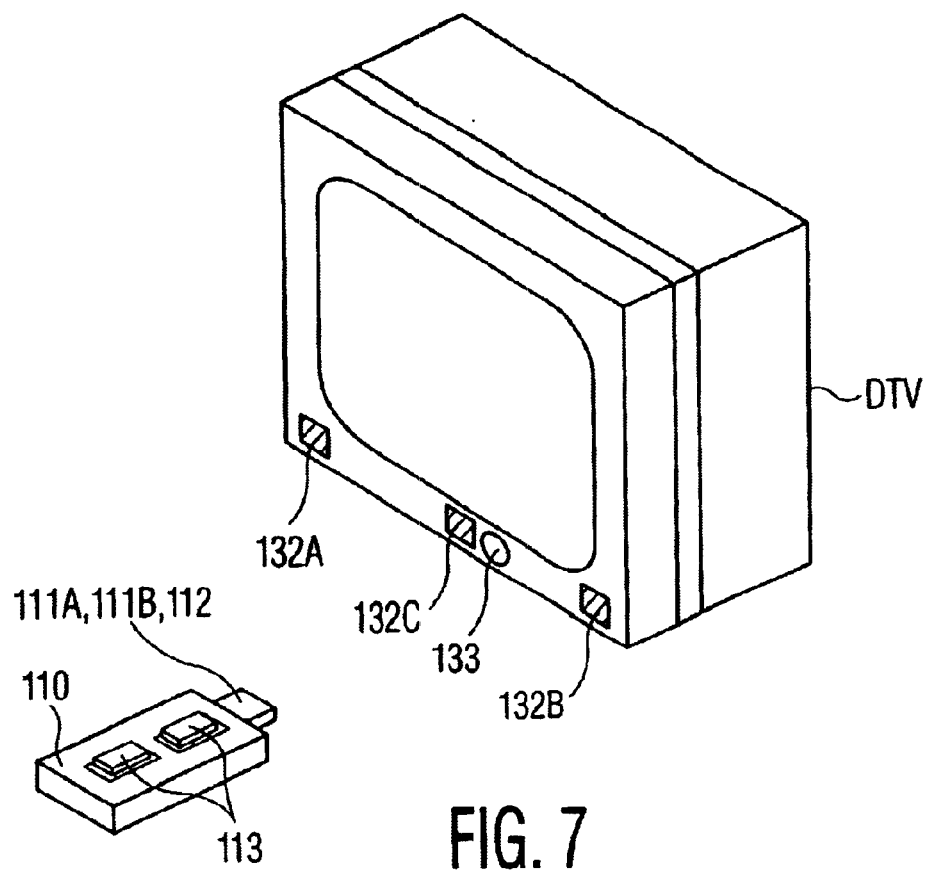
FIG. 7 is a perspective view of a three dimensional (3D), wireless remote controller according to a second embodiment of the invention.
Figures 8, 9:
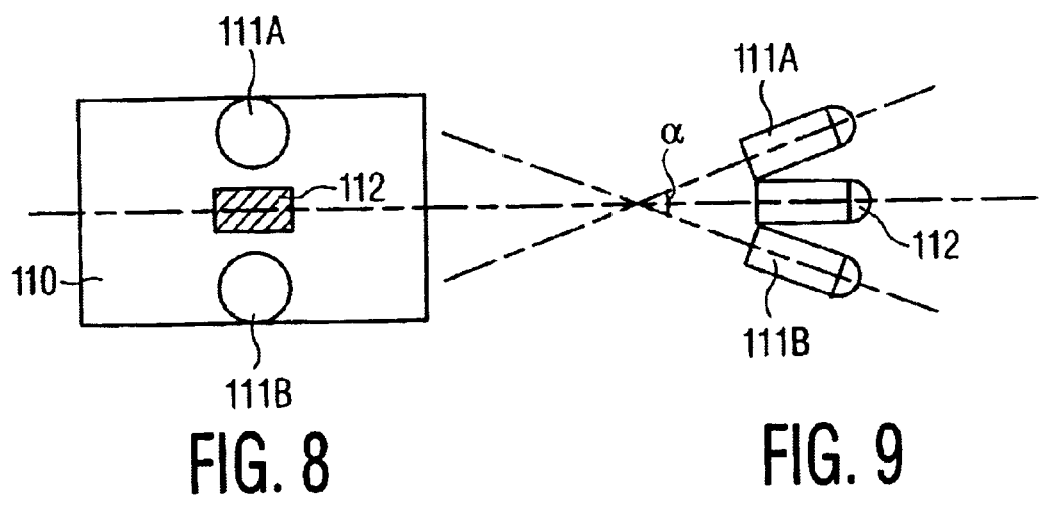
FIG. 8 is a front view of an ultrasonic wave (UW) generator and a pair of infrared (IR) emitters in the 3D remote controller illustrated in FIG. 7.
FIG. 9 is a side view of the arrangement of the UW generator and the IR emitters of the 3D remote controller illustrated in FIG. 7.
Figure 10:
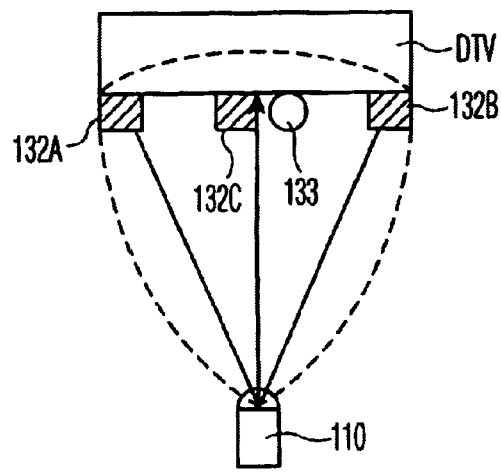
FIG. 10 is a plan view of the beam distribution pattern produced by the UW generator and the IR emitters of the 3D remote controller of FIG. 7.
Figure 11:
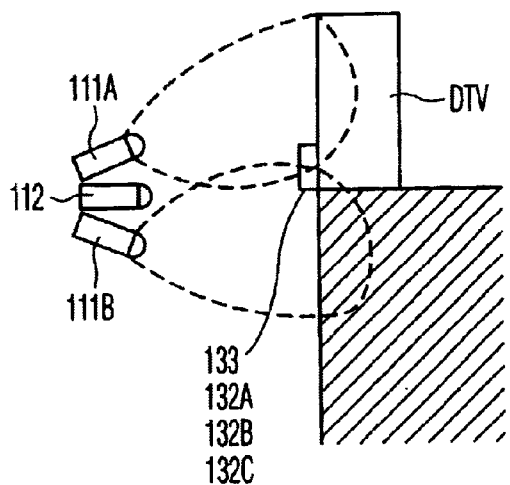
FIG. 11 is a side view of the beam distribution pattern produced by the UW generator and the IR emitters of the 3D remote controller of FIG. 7.

FIG. 7 is a perspective view of an alternative DTV system which includes a 3D wireless remote controller 1' and both ultrasonic wave (UW) receiving sensors 132A, 132B, and 132C and an IR receiving sensor 133 disposed close to or on the DTV. FIGS. 8 and 9 are front and side views of an arrangement of the IR emitters 111A and 111B and the UW generator 112 in the remote controller 1' shown in FIG. 7. It will be appreciated that the IR emitters 111A and 111B are arranged in a Y-axis direction with an angle α between them and that the UW generator 112 is disposed midway between the IR emitters 111A and 111B. The remote controller 1' and the receiving circuitry 45, which includes the sensors 1132A–132C and 133, are arranged so that their axial directions are orthogonal. to one another. FIGS. 10 and 11 are plan and side views of the beam distribution of the IR emitters 111A and 111B and the UW generator 112 in the remote controller 1' shown in FIG. 7.

Figure 12:
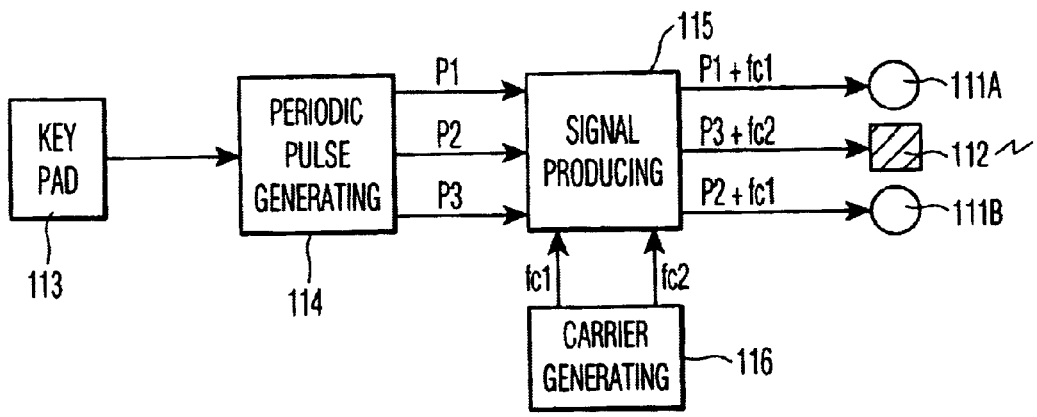
FIG. 12 is a block diagram of the transmitter side of the 3D remote controller of FIG. 7.

FIG. 12 is a block diagram of the remote controller 1' in a 3D wireless remote controller 1', which includes:

- a keypad 113 having keys for moving a cursor, selection commands and operation commands;
- a periodic pulse generator 114 for receiving a key signal from the keypad 113 and for generating periodic pulses of a code identifying waveform and a synchronization identifying waveform;
- a signal generator 115 for converting the periodic pulse signal generated in the periodic pulse generator 114 into IR signals P1 and P2 and an UW signal P3 and overlapping these signals with carrier signals fc1 and fc2;

a carrier generator 116 for generating an IR carrier signal fc1 and an ultrasonic carrier signal fc2 and for applying these signals to the signal generator 115 for preventing disturbance or interference of the IR signals and the UW signal during transmission; and a plurality of signal generators of IR emitters 111A and 111B and an UW generator 112 for transmitting the IR signals P1+ fc1 and P2+ fc1 and the UW signal P3+ fc2 from the signal generator 115 into a space.

The IR emitters 111A and 111B and the UW generator 1112 of the plurality of signal generators are arranged in a Y-axis direction at a predetermined angle α.

Figure 13:
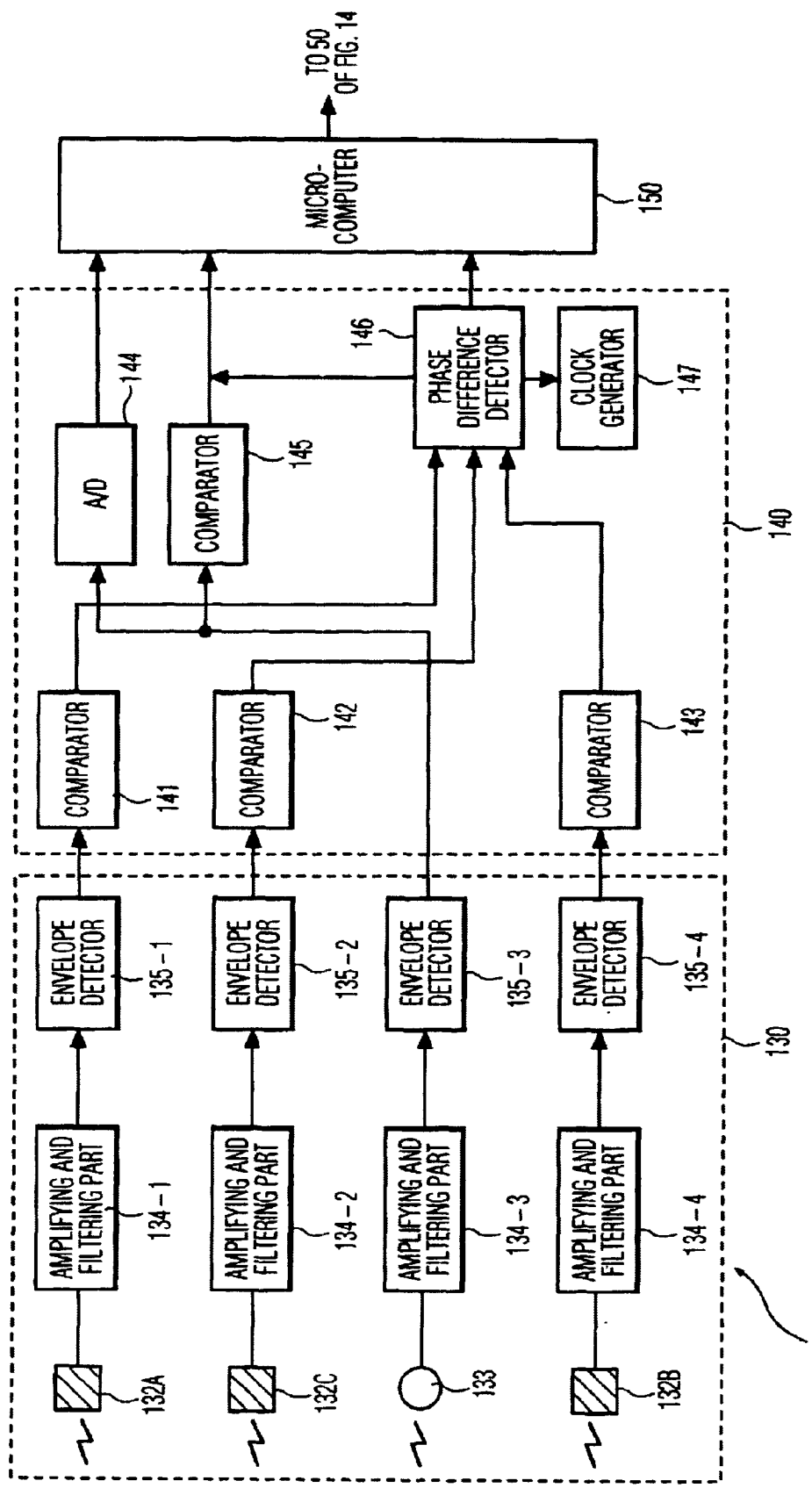
FIG. 13 is a block diagram of the receiver side of the 3D remote controller of FIG. 7.

FIG. 13 is a block diagram of signal receiving circuitry 45 associated with the 3D wireless remote controller 1', which includes:

a detector stage 130, i.e., a sensor array, having the plurality of UW receiving sensors 132A, 132B and 132C and the IR receiving sensor 133 mounted on or near the DTV and spaced predetermined distances apart in the X-axis direction crossed at a right angle to the IR emitters 111A and 111B and the UW generator 112 in the remote controller 1' for detecting the UW and the IR signals;

a spatial position analyzer stage 140 for converting the IR signal and the UW signals detected by the detector stage 130 into a digital signal and timing signals respectively and detecting phases of the UW signals with reference to the time when the IR signal is detected; and a microcomputer 150 for using an intensity of the IR signal and the phases of the UW signals digitized and detected in the spatial position analyzer 140 respectively in obtaining X, Y, Z coordinates of a position to determine a relative 3D position between the remote controller 1' and the detector 130.

Advantageously, the detector stage 130 includes the plurality of UW receiving sensors 132A, 132C and 132B for receiving the UW signals transmitted from the remote controller 1', amplifier/filters 134-1, 134-2 and 134-4 for amplifying the weak UW signals received at the UW receiving sensors 132A, 132C and 132B, respectively, and envelope detectors 135-1, 135-2, and 135-4 for removing carrier signals from the UW signals from the amplifier/filters 134-1, 134-2 and 134-4 respectively and detecting intensity levels of acoustic waves received at the UW receiving sensors 132A, 132B and 132C respectively. The detector 130 also includes the IR receiving sensor 133 for receiving the IR signal transmitted from the remote controller 1', an amplifier/filter 134-3 for amplifying the weak IR signal received at the IR receiving sensor 133, an envelope detector 135-3 for removing a carrier signal from the IR signal from the amplifier/filters 134-3 and detecting an intensity level of the IR received at the IR receiving sensor 133.

Still referring to FIG. 13, the signal receiving circuitry 45 advantageously includes the spatial position analyzer stage 140, which includes:

a first comparator 141 for comparing an envelope waveform of the UW signal received at the UW receiving sensor 132A with an internal reference signal to convert into a timing signal;

a second comparator 142 for comparing an envelope waveform of the UW signal received at the UW receiving sensor 132C with an internal reference signal to convert into a timing signal;

a third comparator 143 for comparing an envelop waveform of the UW signal received at the UW receiving sensor 132B with an internal reference signal to convert into a timing signal;

an Analog/Digital Converter (ADC) 144 for digitizing an envelope waveform of the IR signal received at the IR receiving sensor 133;

a fourth comparator 145 for comparing an envelop waveform of the IR signal received at the IR receiving sensor 133 with an internal reference signal to convert into a timing signal for using as a reference signal in calculation of coordinates and code analysis;

a phase difference detector 146 for detecting a relative phase difference of the UW signal from each of the first to third comparators 141–143 with reference to a time when the IR from the fourth comparator 145 is detected; and a clock generator 147 for generating and applying clock signals to the phase difference detector 146.

The operation of the 3D wireless remote controller 1' will now be described while referring to FIGS. 7–13. In the 3D wireless remote controller 1', reception of a key signal from the keypad 113 causes the periodic pulse generator 114 to generate periodic pulses corresponding to a code identifying waveform according to the applied key signal. In addition, the key signal causes the pulse generator 114 to generate periodic synchronization. pulses, generates IR signals P1 and P2 and an UW signal P3 , and applies the signal P1–P3 to the signal generator 115. Then, the carrier generator 116 generates and applies an IR carrier signal fc1 and an ultrasonic carrier signal fc2 to the signal generator 115, for preventing disturbance or interference of the UW and the IR signals during transmission.

The signal generator 115 mixes the IR carrier signal fc1 and the ultrasonic carrier signal fc2 from the carrier generator 116 with the IR signals P1 and P2 and the UW signal P3 from the periodic pulse generator 114, respectively, and transmits the composite IR signals P1+ fc1 and P2+ fc1 and UW signal P3+ fc2 through the IR emitters 11A and 11B and the UW generator 112, respectively. Then, the periodic pulse signal generated in the periodic pulse generator 114 is loaded on the IR signals. The distribution of the IR and the UW signals transmitted in the space through the IR emitters 11A and 111B and the UW generator 112 respectively is as shown in FIGS. 10 and 11.

The UW receiving sensors 132A, 132C and 132B in the detector 130, attached on both ends and center in an X-axis direction spaced predetermined distances apart at a lower part of the DTV, receive the UW signals transmitted from the remote controller 1', and apply these signals to the amplifier/filters 134-1, 134-2 and 134-4 connected to the UW receiving sensors 132A, 132C and 132B, respectively. In addition, the IR receiving sensor 133, which is also attached to the DTV, receives the IR signal transmitted from the remote controller 1', and applies that signal to the amplifier/filter 134-3. The IR receiving sensor 133 receives the signal transmitted from the IR emitter 111A and, after a predetermined time, receives the signal transmitted from the IR emitter 111B.

Accordingly, the amplifier/filter 134-1 amplifies the UW signal received at the UW receiving sensor 132A and provides its carrier frequency band to the envelope detector 135-1; the envelope detector 135-1 removes the carrier frequency from the output of the amplifier/filter 134-1 and detects an amplitude level of the acoustic wave received at the UW receiving sensor 132A. The amplifier/filter 134-2 likewise amplifies the UW. signal received at the UW receiving sensor 132C and produces its carrier frequency band to the envelope detector 135-2, which removes the carrier frequency from the output of the amplifier/filter 134-2 and detects an amplitude level of the acoustic wave received at the UW receiving sensor 132C. The amplifier/filter 134-3 also amplifies the IR signal received at the IR receiving sensor 133 provides only its carrier frequency band to the envelope detector 135-3; the envelope detector 135-3 removes the carrier frequency from the output of the amplifier/filter 134-3 to detect an intensity level of the light received at the IR receiving sensor 133. Moreover, the amplifier/filter 134-4 amplifies the UW signal received at the UW receiving sensor 132B and provides the carrier frequency band to the envelope detector 135-4; the envelope detector 135-4 removes the carrier frequency from the output of the amplifier/filter 134-4 and detects an amplitude level of the acoustic wave received at the UW-receiving sensor 132B.

The output from the envelope detector 135-1 is applied to the first comparator 141 in the spatial position analyzer stage 140, which compares the envelope waveform of the UW signal received through the UW receiving sensor 132A to an internal reference signal and generates a first timing signal, which signal is applied to the phase difference detector 146. The output from the envelope detector 135-2 is applied to the second comparator 142, which compares the envelope waveform of the UW signal received through the UW receiving sensor 132C to an internal reference signal and generates a second timing signal, which is also applied to the phase difference detector 146. The output from the envelope detector 135-4 is applied to the third comparator 43, which compares the envelope waveform of the UW signal received through the UW receiving sensor 132C to an internal reference signal and generates a third timing signal, which again is applied to the phase difference detector 146.

Furthermore, the output from the envelope detector 135-3 which detects the envelope of the IR signal received at the ADC 144 in the spatial position analyzer 140 and generates a digital signal, which is applied to the microcomputer 150 as well as the comparator 145 where the digital signal is compared with an internal signal in order to generate a fourth timing signal. The output from the fourth comparator 145 is applied to the phase difference detector 146 as a reference signal for use in a coordinate calculation as well as to the microcomputer 150 for analyzing a code. That is, the output of the fourth comparator 145, which converts the IR signal into the fourth timing signal, is employed as an all purpose reference signal.

Synchronous with the clock generated in the clock generator 147, the phase difference detector 146 detects an arrival time difference of each of the UW signals. received through the first to third comparators 141-43 with reference to an arrival time of the IR signal received through the fourth comparator 145 to detect a phase difference of each of the UW signals and applies these differences to the microcomputer 150. The microcomputer 150 uses the time intervals in the timing signal from the fourth comparator 145 in analyzing a code identifying waveform and a synchronization identifying waveform, conducts a general process if the identified code is a command code not requiring a movement of the cursor, and calculates X-, Y-, Z-axis coordinates of the:data from the spatial position analyzer 140 if the identified code is a command code for a movement of the cursor. If the identified code is a command code for a movement of the cursor, since each of the phases of the UW signal from the UW generator 112 received at the UW receiving sensors 132A, 132B and 132C will show a relative difference depending on X-axis angles between the UW signal and the UW receiving sensors 132A, 132B and 132C, the microcomputer 150 uses this phenomenon in calculating the X-axis coordinate.

In short, since the phase difference detector 146 calculates a detection time difference for each of the UW signals detected with respect to the detection time of the IR signal and applies these difference signals to the microcomputer 150, the microcomputer 150 measures a relative phase difference of each of the UW signals, which phase differences advantageously can be employed in calculating an X-axis coordinate, i.e., the X-axis position data. Furthermore, since intensity levels of the IR signals from the IR emitters 111A and 111B at the IR receiving sensor 133 will show a relative difference depending on Y-axis angles between the IR signals and the IR receiving sensor 133, the microcomputer 150 uses this phenomenon in calculating. the Y-axis coordinate, i.e., the Y-axis position data.

Figure 14:
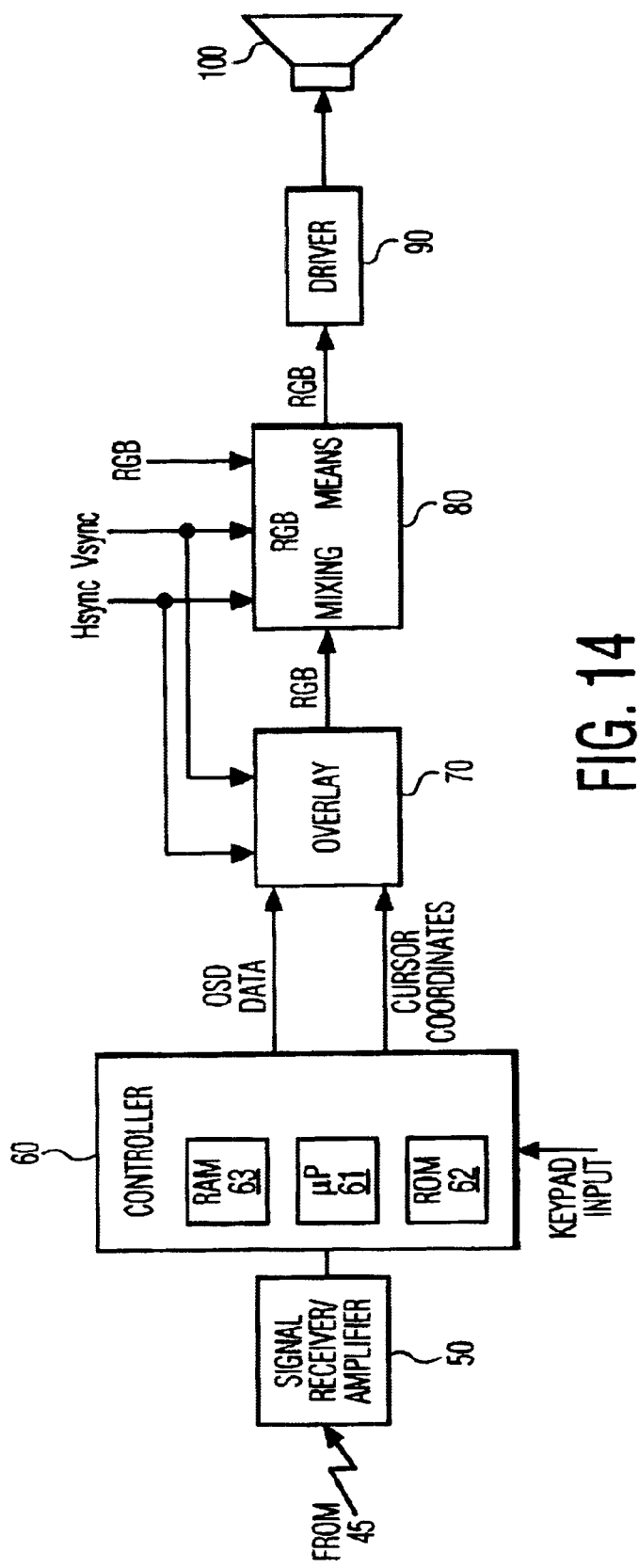
FIG. 14 a block diagram illustrating selected portions of a DTV including a "smart" EPG processor of a second embodiment of the present invention.

It will also be appreciated that the differences in the arrival times of the UW from the UW generator 112 at the UW receiving sensor 132A, of the UW from the UW generator 112 at the UW receiving sensor 132B, and of the UW from the UW generator 112 at the UW receiving sensor 132C, can be averaged to obtain the Z-axis coordinate value. Thus, the microcomputer 150 obtains the X-, Y-, Z-axis coordinates to determine the 3D relative position difference between the remote controller 1' and the detector 130. These coordinates advantageously can be applied to the receiver/amplifier 50', which is illustrated in FIG. 14. It will be appreciate that the circuitry 45 and the receiver/amplifier 50 illustrated in FIGS. 13 and 14 advantageously can be combined, either alone or with the controller 60 to eliminate redundant components and minimize the cost of the DTV system.

Additional preferred embodiments of the present invention will now be described while referring to FIGS. 15–18. However, since most of the circuitry will be virtually identical to that illustrated and described with respect to FIGS. 3 and 5, only those features which are different will be described in any detail.

Figure 15:
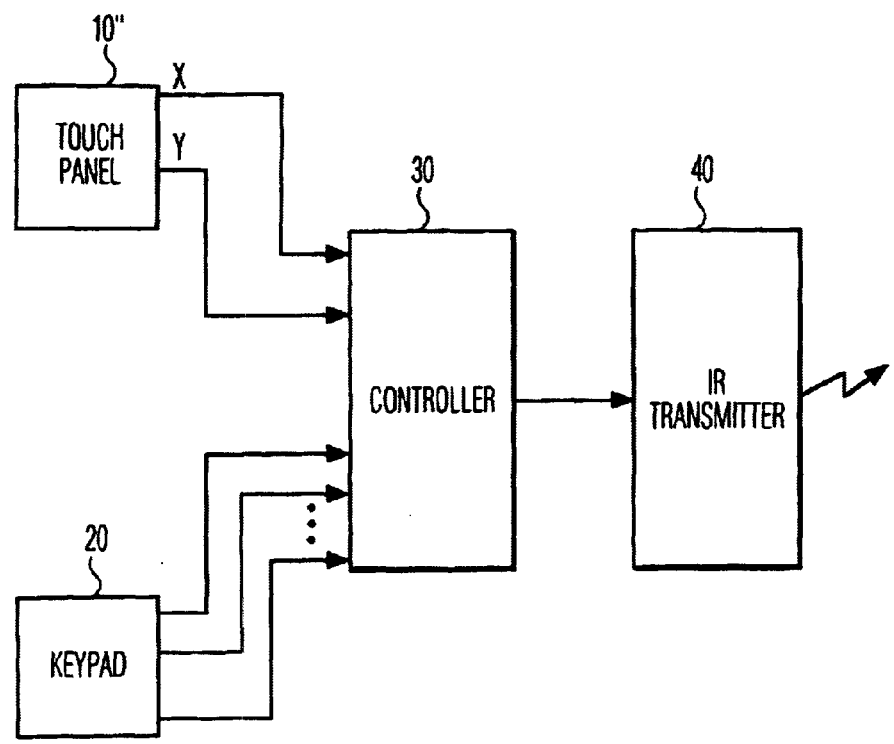
FIG. 15 depicts a 2D remote controller according to a third embodiment of the invention.

FIG. 15 is a high level block diagram of a remote controller 1", which is substantially similar to the remote controller 1 but for the replacement of the pointer 10 with a touch panel 10". This touch panel advantageously can be similar to the touch screen disclosed in the EP 661 application, which was discussed above. It will be appreciated that the controller 30 receives only X- and Y position information from the touch panel 10", otherwise the operation is the same, i.e., the controller encodes the position data for transmission to the receiver/amplifier 50.

Figure 16:
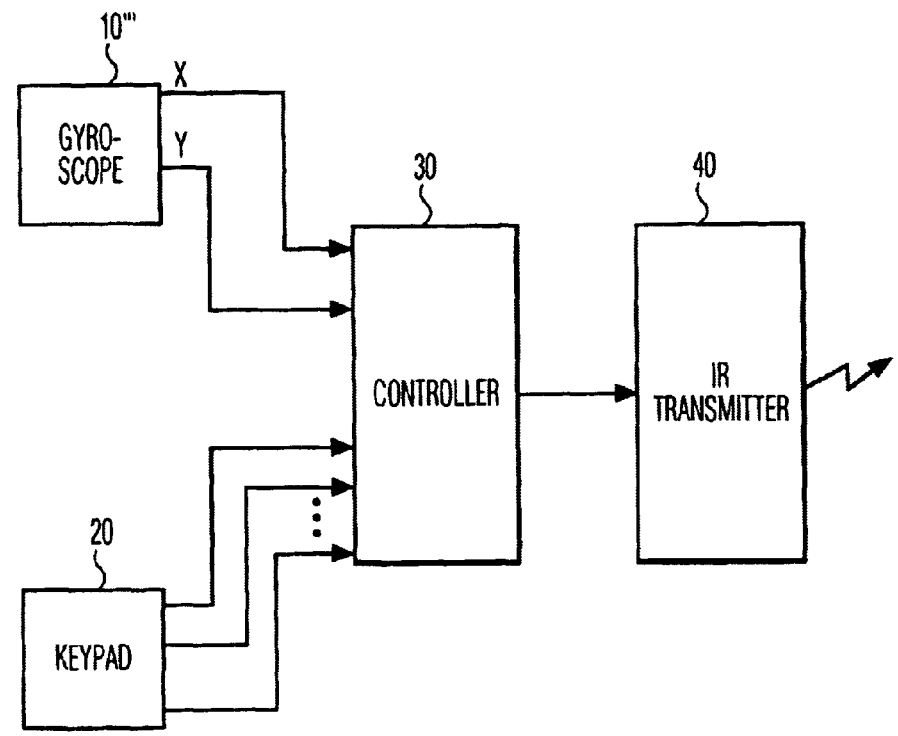
FIG. 16 illustrates a 2D remote controller according to a fourth embodiment of the invention.
Figure 17:
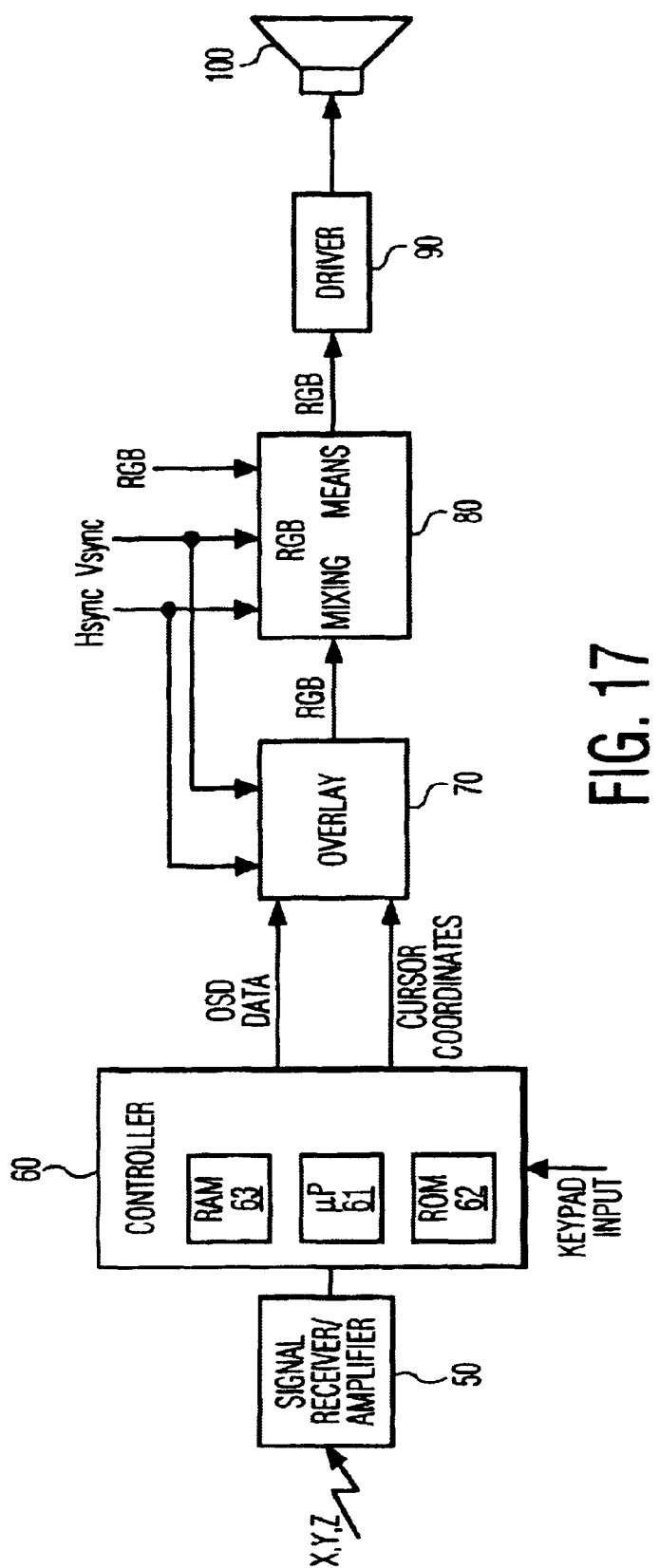
FIG. 17 a block diagram illustrating selected portions of a DTV including a fourth preferred embodiment of the "smart" EPG processor of the present invention.

In accordance with a fourth preferred embodiment of the invention, the pointer 10 in the remote controller 1 advantageously can be replaced by a low-cost laser gyroscope 10''', thus producing the remote controller 1''', as illustrated in FIG. 16. It will be appreciated that the laser gyroscope can be of the type disclosed in U.S. Pat. No. 5,960,022, which patent is incorporated by reference for all purposes. It will also be appreciated that the laser gyroscope advantageously can generate either 2D or 3D position data, which is applied to the smart EPG controller 60 in the DTV. It should be mentioned that Z-axis data can be provided to the controller 60 via the receiver 50''', wherein the Z-axis data can be employed to differentiate motion corresponding to character data from other types of data, as shown in FIG. 17.

Figure 18:
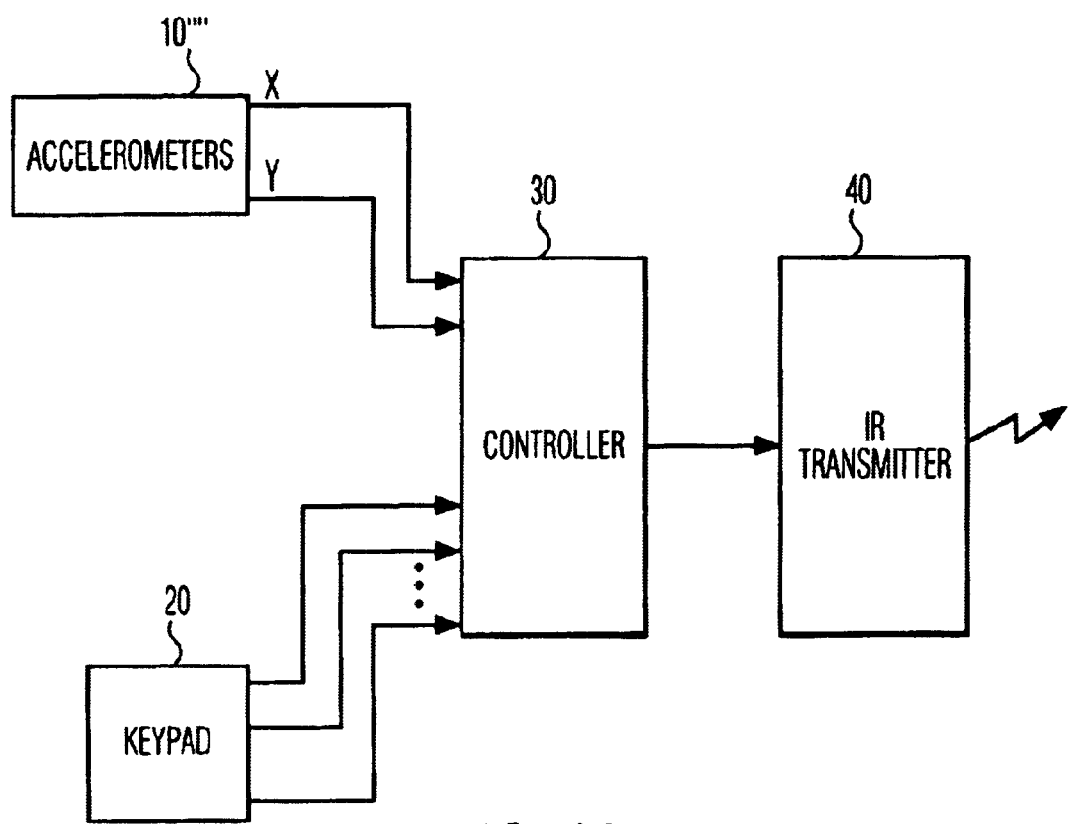
FIG. 18 illustrates a 2D remote controller according to a fifth embodiment of the invention.

Moreover, a fifth preferred embodiment of the remote controller for the smart EPG controller replaces the pointer 10 with a plurality of accelerometers, e.g., accelerometers 10x and 10y in position sensor 10"", as illustrated in FIG. 18. It will be appreciated that the accelerometers provide X- and Y-axis position data to the controller 30, as discussed in detail above.

Thus, by moving the remote control with respect to a "reference" point, the remote control generates a set of (x, y) coordinates by measuring the relative position of the remote control with respect to the reference point. The reference point advantageously can be the natural or resting position with which the viewer holds the remote control. It will be appreciated that the viewer can "draw" letters by moving the remote control relative to the reference point. The trajectory of the movement is measured/sampled, in exemplary cases, by the gyroscope or the accelerometers to thereby generate the set of (x, y) coordinates, i.e., the X- and Y-axis position data. This set of (x, y) coordinates are transmitted to the DTV using RF or IR signals as they are generated.

The DTV, after receiving the set of (x, y) coordinates, converts these coordinates to position data relative to the smart EPG controller's data space, e.g., screen position data. The smart EPG controller accumulates this position data to form lines, strokes or other suitable data structures suitable for input to the character recognition routine. Any characters recognized will be applied to the search engine of the smart EPG controller, and any exact or approximate matches, depending on the viewer's preferences, will be displayed as search results on the DTV. The viewer can then select the desired program from the search results using the remote controller, either in the conventional manner or by writing further characters in the air to signal the viewers selection.

It should again be mentioned that the Z-axis position data advantageously can be used to signal meaningful position data from non-meaningful movements. For example, many character recognition routines and programs are more effective when the user forms characters as a particular sequence of strokes. Using the Z-axis position data, the viewer can differentiate meaningful strokes from noise strokes simply by drawing meaningful stokes between the reference point and the DTV or digital VCR being operated. All stroke made behind the reference point will be considered noise strokes, which permits the viewer to reposition the remote controller (1''', 1'''') prior to making the next meaningful stroke.

In summary, a digital television (DTV) system includes a remote controller and an electronic program guide (EPG) controller. The remote controller generates X- and Y-axis position data. Moreover, the EPG controller receives position data responsive to the X- and Y-axis position data, generates character data responsive to the position data, searches EPG data for character strings approximating the character data to thereby generate search results, and outputs the search results to the screen of the DTV. According to one aspect of the invention, the remote controller generates the X- and Y-axis position data is generated responsive to movement of the remote controller. This movement can be determined by either accelerometers or a gyroscope included in the remote controller. According to another aspect of the invention, the X- and Y-axis position data can be generated by a pointing device, which can be either a touch panel or a trackball.

Alternatively, the DTV system includes a remote controller which generates a plurality of different electromagnetic signals occupying a predetermined beam pattern, a sensor array which determines X- and Y-axis position data responsive to the relative position of the sensor array within the beam pattern, and an electronic program guide (EPG) controller. Preferably, the EPG controller accumulates position data responsive to the X- and Y-axis position data, generates character data responsive to the X- and Y-axis position data, searches EPG data for character strings approximating the character data to thereby generate search results, and outputs the search results to the screen of the DTV. According to one aspect of the invention, the position data varies responsive to movement of the remote controller.

Moreover, a method for operating a digital television (DTV) system storing electronic program guide (EPG) data responsive to X- and Y-axis position data generated by a remote controller advantageously includes steps for accumulating position data corresponding to the X- and Y-axis position data to thereby produce accumulated position data, recognizing character data included in the accumulated position data, searching the stored EPG data for character strings approximating the character data to thereby generate search results, and displaying the search results on the DTV. According to one aspect of the invention, the method also includes a step for generating the X- and Y-axis position data by moving the remote controller. Alternatively, the X- and Y-axis position data advantageously can be generated by moving either a predetermined portion of the remote controller or a pointer relative to a predetermined portion of the remote controller.

Finally, a method for operating a digital television (DTV) system storing electronic program guide (EPG) data responsive to X- and Y-axis position data generated by movement of a remote controller includes steps for:

transmitting a plurality of electromagnetic signals from the remote controller;

sensing the beam pattern of the electromagnetic signals relative to a sensing array to thereby generate the X- and Y-axis position data;

converting the X- and Y-axis position data into position data;

accumulating position data corresponding to the X- and Y-axis position data to thereby produce accumulated position data;

recognizing character data included in the accumulated position data; and searching the stored EPG data for character strings approximating the character data to thereby generate search results; and displaying the search results on the DTV.

Finally, it should be mentioned that all of the U.S. Patents and the European Patent Application discussed above are incorporated by reference, to the maximum extent possible, into this application for all purposes.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A digital television (DTV) system comprising:

a remote controller which generates X- and Y-axis position data; and an electronic program guide (EPG) controller provided within said DTV device which receives and accumulates position data responsive to the X- and Y-axis position data to form data structures capable of forming characters, and recognizes character data responsive to the data structures, and which searches EPG data for character strings approximating the character data to thereby generate search results, and which outputs the search results to the screen of the DTV as on-screen display characters.

2. The DTV system as recited in claim 1, wherein the X- and Y-axis position data generated by the remote controller is generated in response to movement of the remote controller.

3. The DTV system as recited in claim 2, wherein the remote controller comprises a plurality of accelerometers generating raw data corresponding to the X- and Y-axis position data.

4. The DTV system as recited in claim 2, wherein the remote controller comprises a laser gyroscope generating raw data corresponding to the X- and Y-axis position data.

5. The DTV system as recited in claim 1, wherein the remote controller further comprises a pointing device which generates raw data corresponding to the X- and Y-axis position data.

6. The DTV system as recited in claim 5, wherein the pointing device comprises a touch panel.

7. The DTV system as recited in claim 5, wherein the pointing device comprises a track ball.

8. A digital television (DTV) system comprising:
- a remote controller which generates a plurality of different electromagnetic signals occupying a predetermined beam pattern;
- a sensor array which determines X- and Y-axis position data responsive to the relative position of the sensor array within the beam pattern; and
- an electronic program guide (EPG) controller provided within said DTV device which receives and accumulates position data responsive to the X- and Y-axis position data to form data structures capable of forming characters, and recognizes character data responsive to the data structures, and searches EPG data for character strings approximating the character data to thereby generate search results, and which outputs the search results to the screen of the DTV as on-screen display characters, wherein the position data varies responsive to movement of the remote controller.

9. A method for operating a digital television (DTV) system storing electronic program guide (EPG) data responsive to X- and Y-axis position data generated by a remote controller, comprising:
- receiving X- and Y-axis position data at a DTV and accumulating position data corresponding to the X- and Y-axis position data to thereby form data structures capable of forming characters;
- recognizing character data included in the data structures;
- searching the stored EPG data for character strings approximating the character data to thereby generate search results; and
- displaying the search results on the DTV as on-screen display characters.

10. The method as recited in claim 9, further comprising:
generating the X- and Y-axis position data by moving the remote controller.

11. The method as recited in claim 9, further comprising:
generating the X- and Y-axis position data by moving a predetermined portion of the remote controller.

12. The method as recited in claim 9, further comprising:
generating the X- and Y-axis position data by moving a pointer relative to a predetermined portion of the remote controller.

13. A method for operating a digital television (DTV) system storing electronic program guide (EPG) data responsive to X- and Y-axis position data generated by movement of a remote controller, comprising:
- transmitting a plurality of electromagnetic signals from the remote controller;
- sensing the beam pattern of the electromagnetic signals relative to a sensing array to thereby generate the X- and Y-axis position data;
- converting the X- and Y-axis position data into position data;
- accumulating position data corresponding to the X- and Y-axis position data to form data structures capable of forming characters;
- recognizing character data included in the data structures;
- searching the stored EPG data for character strings approximating the character data to thereby generate search results; and
- displaying the search results on the DTV.

14. The method as recited in claim 13, wherein the X- and Y-axis position data varies responsive to movement of the remote controller.

15. The DTV system as recited in claim 1, wherein the data structures comprise structures representing lines or strokes.

16. The DTV system as recited in claim 8, wherein the data structures comprise structures representing lines or strokes.

17. The DTV system as recited in claim 9, wherein the data structures comprise structures representing lines or strokes.

18. The DTV system as recited in claim 13, wherein the data structures comprise structures representing lines or strokes.

19. The DTV system as recited in claim 8, wherein the sensor array further determines Z-axis position data responsive to the beam pattern, said Z-axis position data to differentiate meaningful position data used to generate characters from non-meaningful remote controller movement.

20. The method as recited in claim 14, wherein the sensing step determines Z-axis position data used to differentiate meaningful position data used to generate characters from non-meaningful remote controller movement.

* * * * *